United States Patent
Chiang (10) Patent No.: US 8,413,947 B2
(45) Date of Patent: Apr. 9, 2013

(54) POSITIONING DEVICE FOR BATTERY BOX

(75) Inventor: Pi-Yun Chiang, Taichung Hsien (TW)

(73) Assignee: Joy Industrial Co., Ltd., Taichung Hsien (TW)

( * ) Notice: Subject to any disclaimer, the term of this patent is extended or adjusted under 35 U.S.C. 154(b) by 200 days.

(21) Appl. No.: 12/966,114

(22) Filed: Dec. 13, 2010

(65) Prior Publication Data

US 2012/0145852 A1 Jun. 14, 2012

(51) Int. Cl.
*F16M 13/00* (2006.01)
(52) U.S. Cl.
USPC ............ 248/553; 248/220.21; 248/224.8; 180/207.3; 180/220; 206/703; 224/902
(58) Field of Classification Search ............. 248/205.1, 248/220.21, 220.22, 224.8, 309.1, 551, 552, 248/553; 180/68.5, 207.3, 205.1, 220, 218; 320/107, 137; 318/497; 206/703; 224/412, 224/441, 902; 70/233, 235; 429/100
See application file for complete search history.

(56) References Cited

U.S. PATENT DOCUMENTS

| | | | | |
|---|---|---|---|---|
| 6,016,882 A | * | 1/2000 | Ishikawa | 180/207.3 |
| 6,423,443 B1 | * | 7/2002 | Tsuboi et al. | 429/98 |
| 7,117,966 B2 | * | 10/2006 | Kohda et al. | 180/68.5 |
| 8,162,191 B2 | * | 4/2012 | Tetsuka et al. | 224/459 |
| 2009/0261134 A1 | * | 10/2009 | Tetsuka et al. | 224/412 |

* cited by examiner

*Primary Examiner* — Todd M Epps
(74) *Attorney, Agent, or Firm* — Rosenberg, Klein & Lee (57) ABSTRACT

A positioning device includes a battery box having a first connection base and a second connection base on two ends thereof. The first connection base has two first positioning members on two sides thereof. A first fixing base includes a first reception space for receiving the first connection base and the first fixing base is pivotable relative to the first fixing base. A second fixing base is connected to the second positioning portion. The positioning recess guides the positioning members on the first connection base to slide and pivot. The second connection base is connected to the second fixing base. The battery box is easily taken out and installed.

20 Claims, 7 Drawing Sheets

POSITIONING DEVICE FOR BATTERY BOX

FIELD OF THE INVENTION

The present invention relates to a positioning device, and more particularly, to a positioning device for positioning the battery box to the electric bike.

BACKGROUND OF THE INVENTION

Electric bicycles are developed because the battery does not generate pollution such as carbon dioxide and noise so that the electric bicycles or vehicles are welcomed and every government put a lot of money to develop advanced batteries for the electric bicycles or vehicles. The electric bicycles or vehicles are driven by the electric motor which is powered by the battery. The battery is received in a battery box which prevents the battery from being accessed by dust and rains. The battery box includes contact terminals and is connected to the frame of the electric bicycle or vehicle so that the battery can be well positioned and electrically connected with the electric motor.

The conventional way to position the battery box is fixed and the battery box is difficult to be removed when charging. There are some battery boxes which are able to be dis-connected from the bicycle frame.

Taiwan Patent Application No. 093204099 discloses a positioning frame and a battery box, wherein the frame includes locking members on the outside thereof and multiple conductive plates are located at the inside so as to be connected with the control members. The conductive plates are cooperated with springs. The battery box is located in the frame and positioned by the locking members and includes conductive members which are in contact with the conductive plates to form the circuit.

The other positioning device for the battery box is disclosed in Taiwan Patent Application No. 092202511 wherein the battery is connected to the seat tube and the positioning device includes a locking unit which is located at the rear end of the battery. The battery can be removed by unlocking the locking unit. The operation unit is located at the top of the battery so as to operate the locking unit.

The Taiwan Patent Application No. 093204099 has movable pieces to stop the movement of the battery and the Taiwan Patent Application No. 092202511 has a protrusion on the battery box and a recess in the box. The operation unit is operatively connected to the lock of the bicycle wheel.

The movable pieces have to be pivoted to release the battery and the steps for operation of the movable pieces are complicated so that the removal of the battery is not convenient. Besides the frame is located on the carry rack which restricts the position to position the battery. The battery is heavy and might drop to injury the users during removal of the battery from the carry rack.

Although the locking unit has better positioning feature, it involves a complicated structure and requires multiple steps to remove the battery.

The present invention intends to provide a positioning device for battery box and improves the shortcomings of the conventional positioning devices.

SUMMARY OF THE INVENTION

The present invention relates to a positioning device and comprises a battery box having a first connection base and a second connection base on two ends thereof, and the first connection base includes a first positioning portion which includes a positioning member or a positioning recess. The second connection base includes a second positioning portion. A first fixing base is electrically connected to an electric bicycle and has a first reception space in which the first connection base is received. The third positioning portion is located corresponding to the first positioning portion and includes a positioning recess or a positioning member. The first and third positioning portions are engaged with each other, and the first connection base is pivotable relative to the first fixing base. A second fixing base is connected to the electric bicycle and located at one end of the second connection base. The second fixing base is located in opposite to the first fixing base. The second fixing base has a fourth positioning portion and is located corresponding to the second positioning portion. The second and fourth positioning portions are connected to each other. The positioning recess is shaped to guide the positioning member to slide and pivot so as to connect the second connection base and the second fixing base. The battery box can be easily installed and taken out.

The primary object of the present invention is to provide a positioning device for easily and quickly installing the battery box to the first and second fixing bases the electric bicycle, and being taking out from the first and second fixing bases.

Another object of the present invention is to provide a positioning device wherein the first and second fixing bases are connected to desired positions of the electric bicycle, and the battery box is installed to the first and second fixing bases.

Yet another object of the present invention is to provide a positioning device wherein the first fixing bases is connected to the battery box by the engagement of the positioning members and the positioning recesses, and the second connection base is connected to the other end of the battery box by engagement between the protrusion of the second fixing base and the positioning hole in the battery box.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the positioning device of the present invention comprises a battery box 10 and a first fixing base 20 and a second fixing base 30 respectively connected to two ends of the battery box 10.

The battery box 10 has a battery received therein so as to power the electric motor to drive the electric bicycle. The battery box 10 includes a first connection base 11 and a second connection base 12 on two ends thereof. In this embodiment, the first connection base 11 has at least one first positioning portion 13 on one side thereof and there are two first positioning portions 13 on two sides in this embodiment. Each of the first positioning portions 13 includes a positioning member 14 or a positioning recess, wherein the positioning member 14 is an elongate member. The second connection base 12 has handle 15 and a second positioning portion 16. The second positioning position 16 includes a recessed area 17 which has a first inclined surface 171 which has a protrusion 32 or a positioning hole 172.

The first fixing base 20 is electrically connected to an electric bicycle 40 and has a reception space 21 and a connection member 22 which is located on one end of the first fixing base 20 so as to fix the first fixing base 20 to the electric bicycle 40 and electrically connected to the motor. The reception space 21 is located in the top of the first fixing base 20 in which the first connection base 11 is received. The reception space 21 includes contact terminals 23 located therein which are to be electrically connected to the battery box 10. The reception space 21 is defined by three walls and includes an opening 24 in the fourth side thereof and at least one third positioning portion 25 is located in two opposite walls of the reception space 21. In this embodiment, there are two third positioning portions 25 and each of the third positioning portions 25 is located corresponding to the first positioning portion 13 and includes a positioning recess 26 or a positioning member. The positioning recesses 26 each include a first surface 261 and a second surface 262. The first surface 261 is an inclined surface and the second surface 262 is a vertical surface which is shaped to match with a shape of the positioning member 14 which is slid along the first and second surfaces 261, 262. The first surface 261 opens to the opening of the positioning recess 26. The vertical surface is defined when the underside of the second fixing base 20 is positioned horizontally. Besides, the first fixing base 20 can be integrally formed with electric bicycle 40.

The second fixing base 30 is connected to the electric bicycle 40 and located at one end of the second connection base 12. The second fixing base 30 located in opposite to the first fixing base 20. The second fixing base 30 has a fourth positioning portion 31 and located corresponding to the second positioning portion 16. The fourth positioning portion 31 includes a protrusion 32 of a positioning hole. In this embodiment, the second positioning base 30 has the protrusion 32 which is controlled to extend or retract by a control member 33.

The battery box 10 is tilt and the first and third positioning portions 13, 25 are connected to each other so that the positioning members 14 guided by the first and second surfaces 261, 262. The battery box 10 is pivoted about the positioning members 14 so that the second connection base 12 is pivoted toward the second fixing base 30. The control member 33 is operated to extend the protrusion 32 and to be inserted into the positioning hole 172. By this way, the battery box 10 is positioned between the first and second fixing bases 10, 20 and installed to the electric bicycle 40.

At least one pad 27 is located between the reception space 21 and the first connection base 11 so as to buffer impact and friction between the battery 10 and the first fixing base 20.

The first and second fixing bases 20, 30 are fixed to the electric bicycle 40. The positioning members 14 are engaged with the positioning recesses 26 to allow one end of the battery box 10 to be slid and pivoted along the positioning recesses 26. The other end of the battery box 10 is then connected with the second fixing base 30. When taking the battery box 10 out, the battery box 10 is disengaged from the second fixing base 30, and pivoting the battery box 10 to remove the battery box 10 from the first fixing base 20. The battery box 10 can be easily removed.

In detail, the first and second fixing bases 20, 30 are fixed to the electric bicycle 40 at a distance. The battery box 10 is tilt to align the first positioning portion 13 with the third positioning portion 25. The two positioning members 14 are engaged with the positioning recesses 26 by sliding each of the positioning members 14 along the first surface 261 and entering the second surface 262. The battery box 10 is then pivoted toward the second fixing base 30 to engage the positioning members 14 with the positioning recesses 26. The first connection base 11 is received in the reception space 21, and the contact terminals 23 are electrically connected to the battery box 10. The protrusion 32 of the fourth positioning portion 31 is then engaged with the positioning hole 172 of the second positioning portion 16 to position the battery box 10.

Thanks to the first inclined surface 171 of the second positioning portion 16, when the second positioning portion 16 is pivoted relative to the second fixing base 30, no impact happens. The protrusion 32 of the fourth positioning portion 31 is then engaged with the positioning hole 172 of the second positioning portion 16 to quickly position the battery box 10. When taking the battery box 10 out for replacement, the protrusion 32 is retracted from the positioning hole 172 by using the control member 33, and then holding the handle 15 to pivot the battery box 10 the battery box 10 about the positioning members 14 to disengage the second connection base 12 from the second fixing base 30. The positioning members 14 are moved from the second surfaces 262 to the first surface 261, the battery box 10 is tilt and then pulling the battery box 10. The positioning members 14 are removed from the first surfaces 261 and the first connection base 11 is removed from the first fixing base 20. The battery box 10 can be easily removed.

Figure 1:
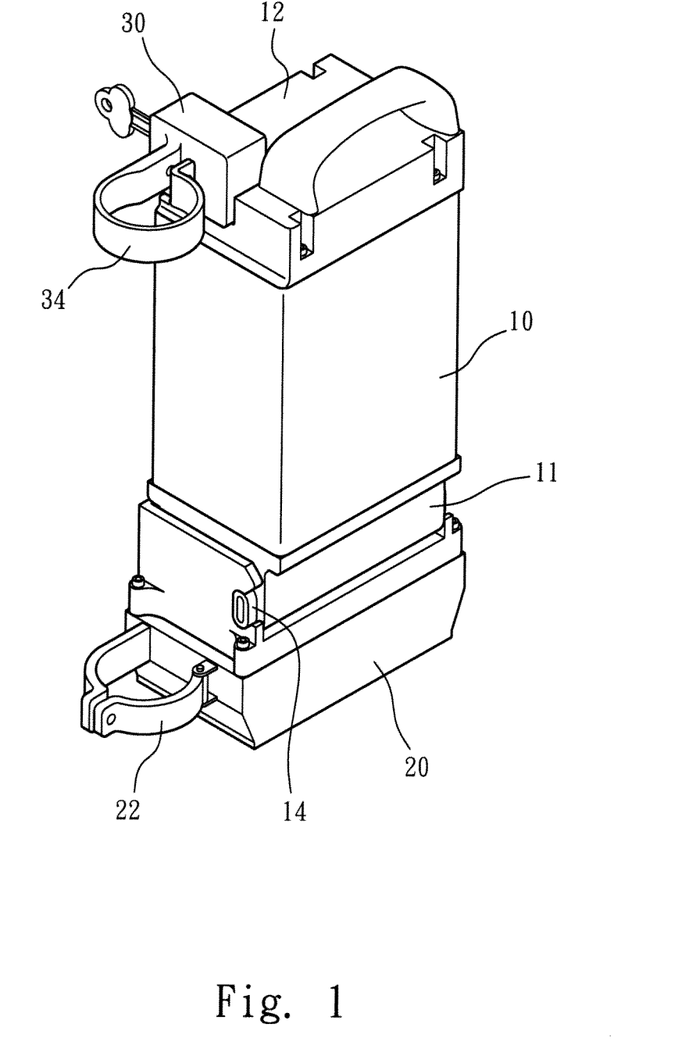
FIG. 1 is a perspective view to show the positioning device and the battery box of the present invention.
Figure 2:
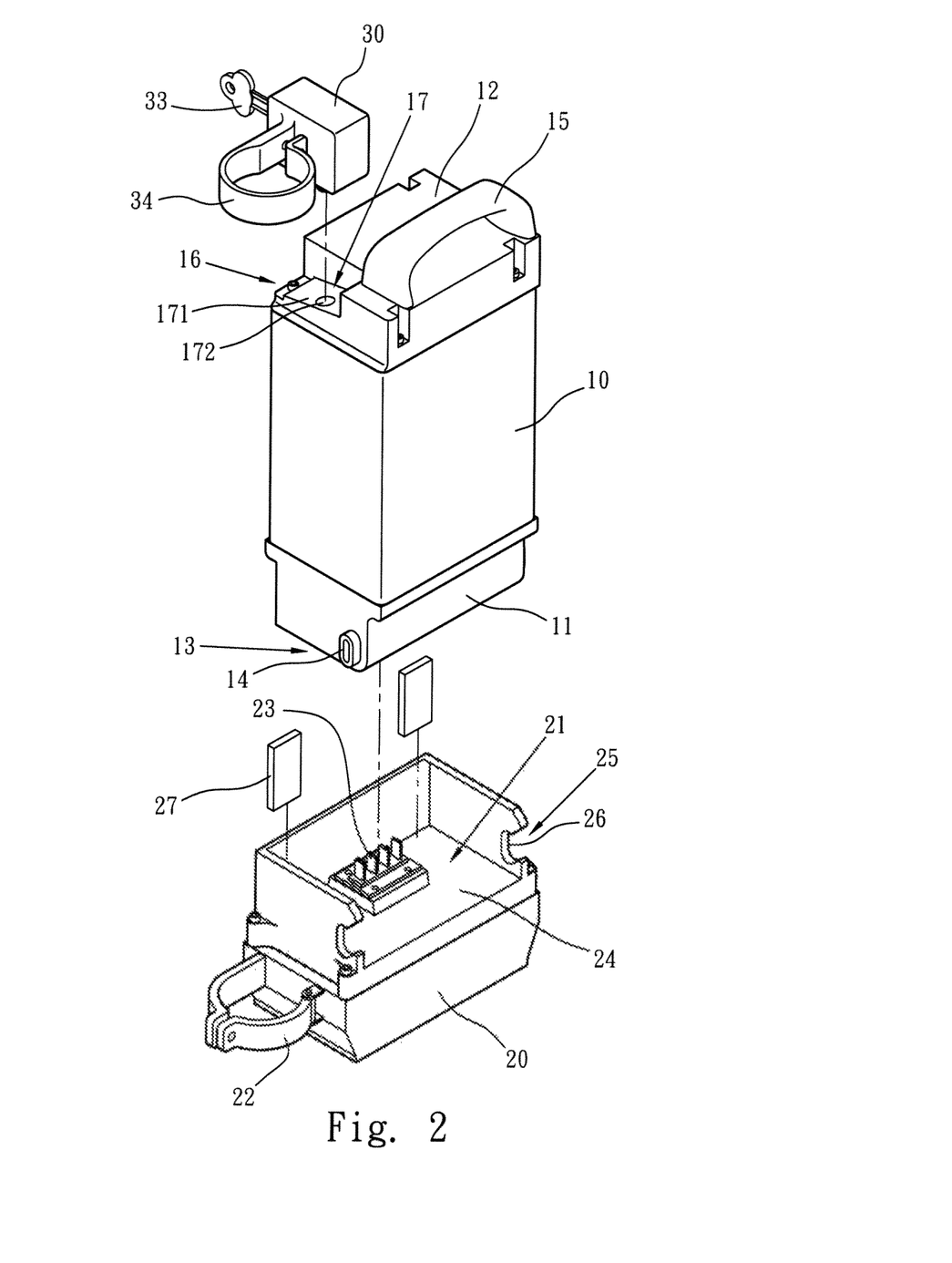
FIG. 2 is an exploded view to show the positioning device and the battery box of the present invention.
Figure 3:
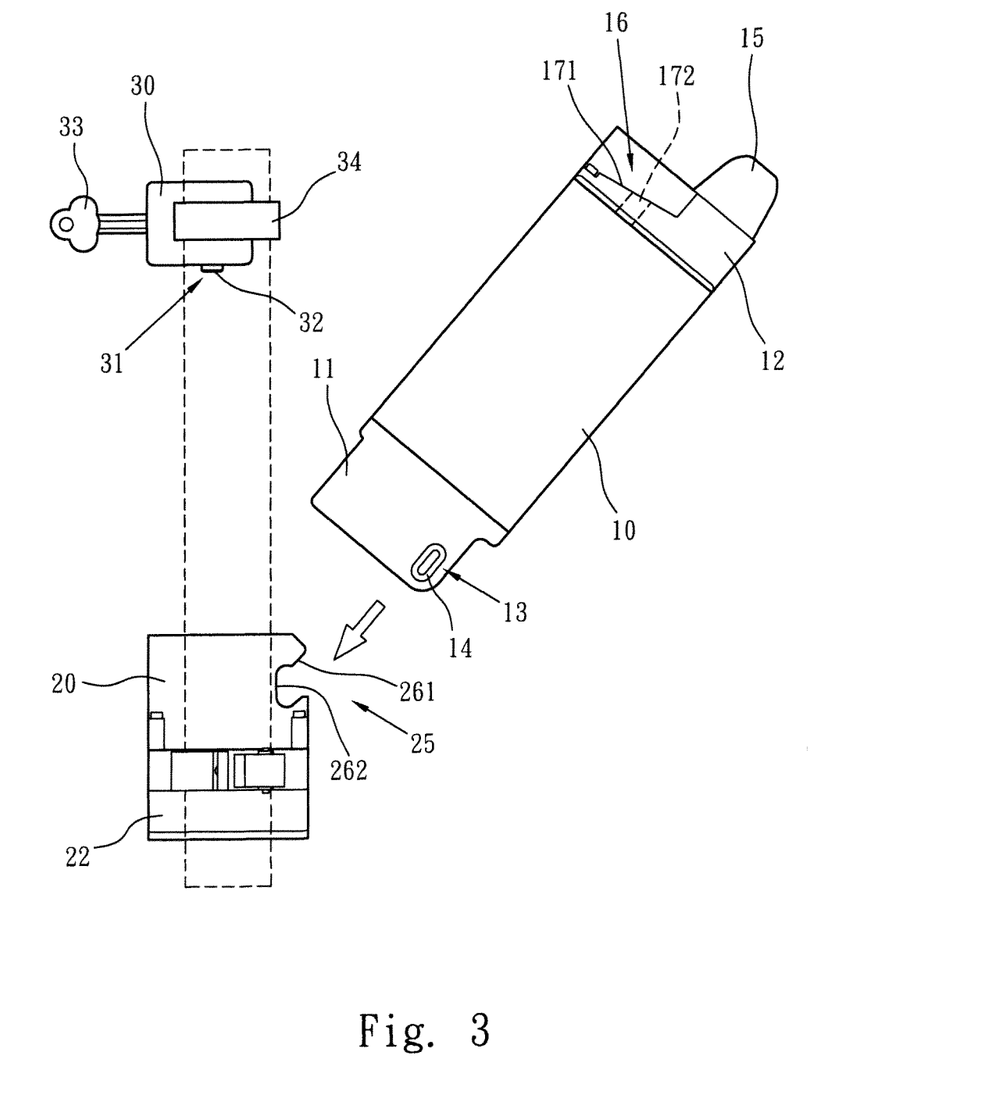
FIG. 3 shows that the battery box is to be engaged with the positioning device of the present invention.
Figure 4:
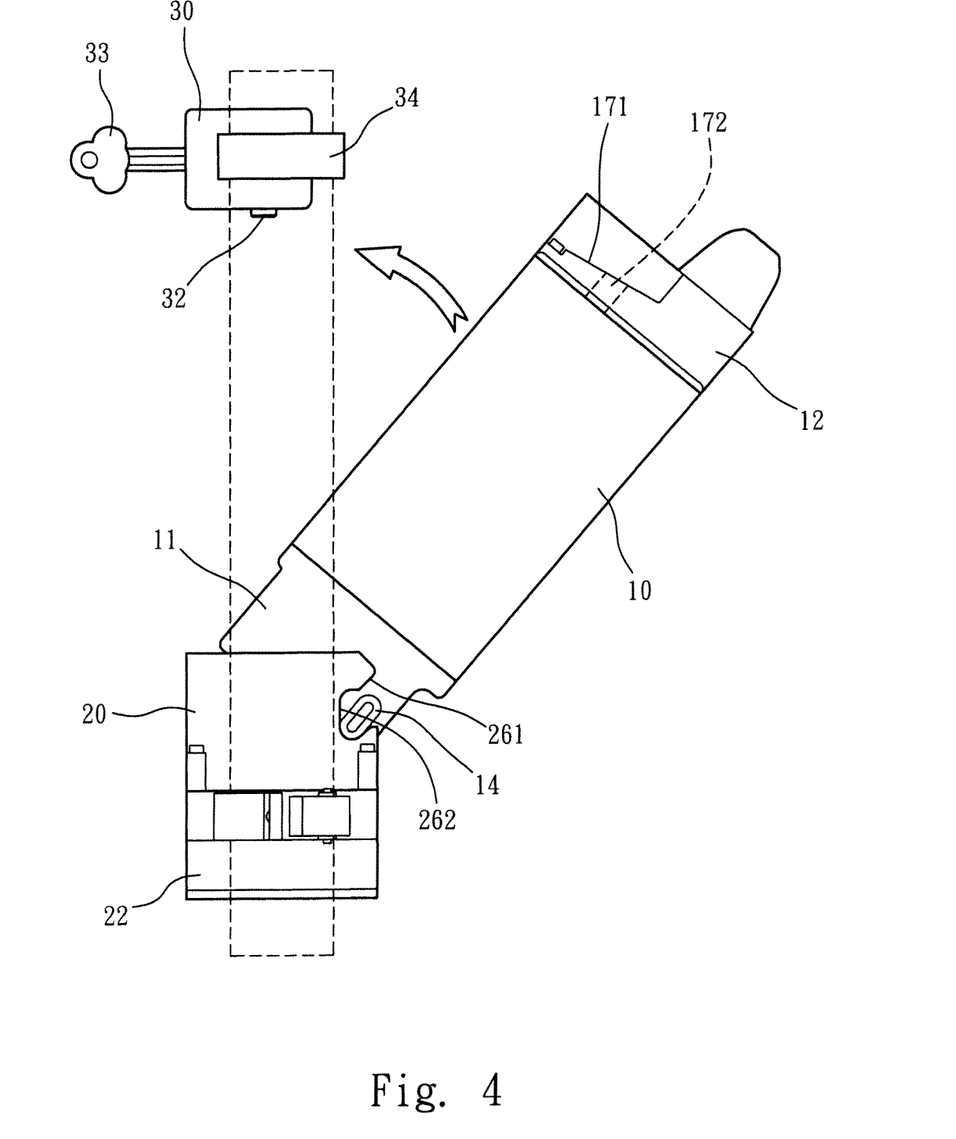
FIG. 4 shows that the positioning members on the battery box are guided and slid into the positioning recess of the second connection base.
Figure 5:
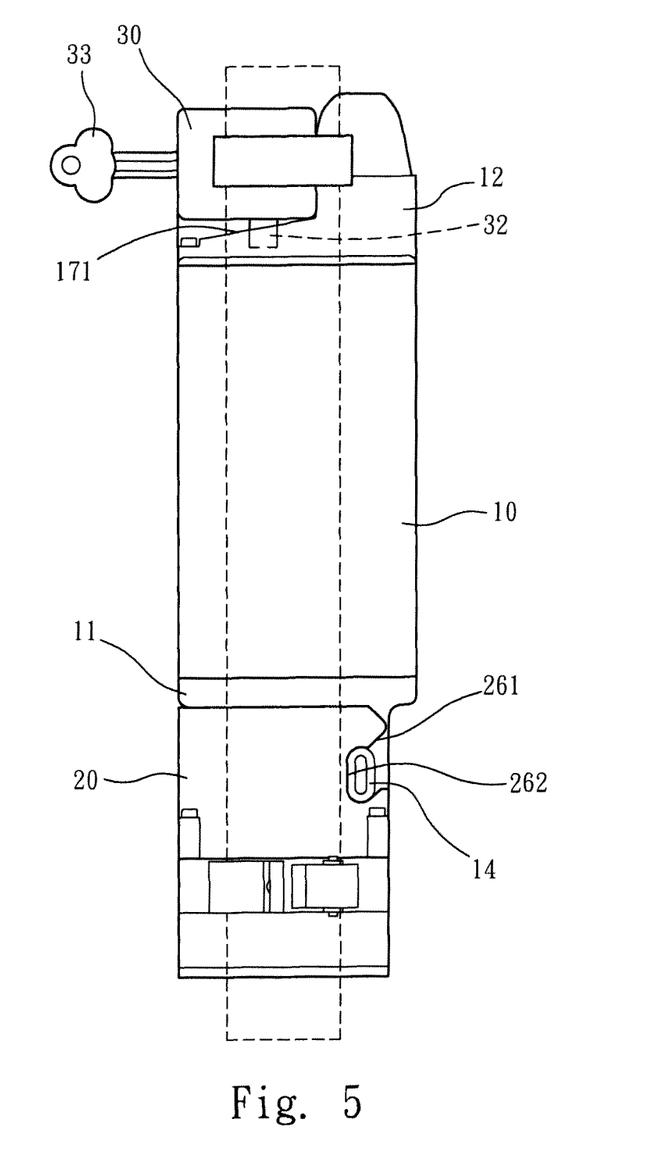
FIG. 5 shows that the battery box is positioned in the positioning device of the present invention.
Figure 6:
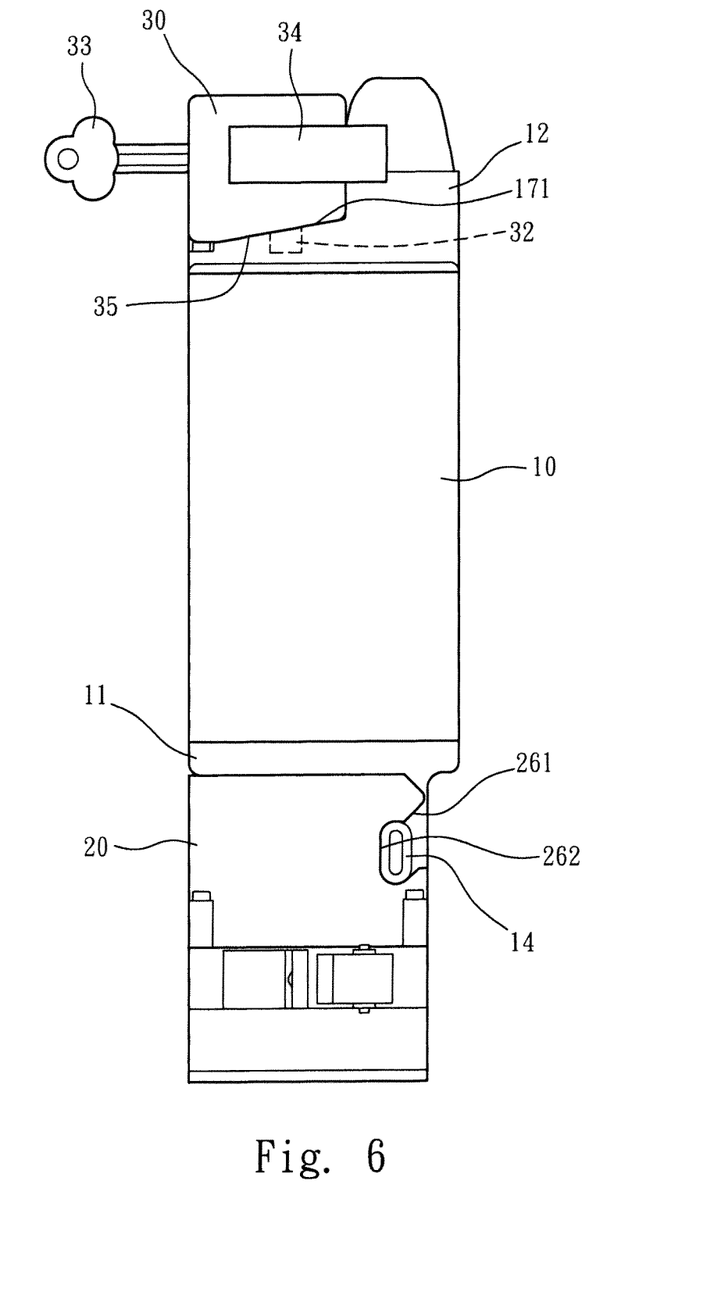
FIG. 6 shows the second embodiment of the positioning device of the present invention.

FIG. 6 shows the second embodiment, wherein the second fixing base 30 has a second inclined surface 35 which is located corresponding to the first inclined surface 171. By the larger contact area between the first and second inclined surfaces 171, 35, and the engagement between the protrusion 32 and the positioning hole 172, the battery box 10 is firmly positioned.

Figure 7:
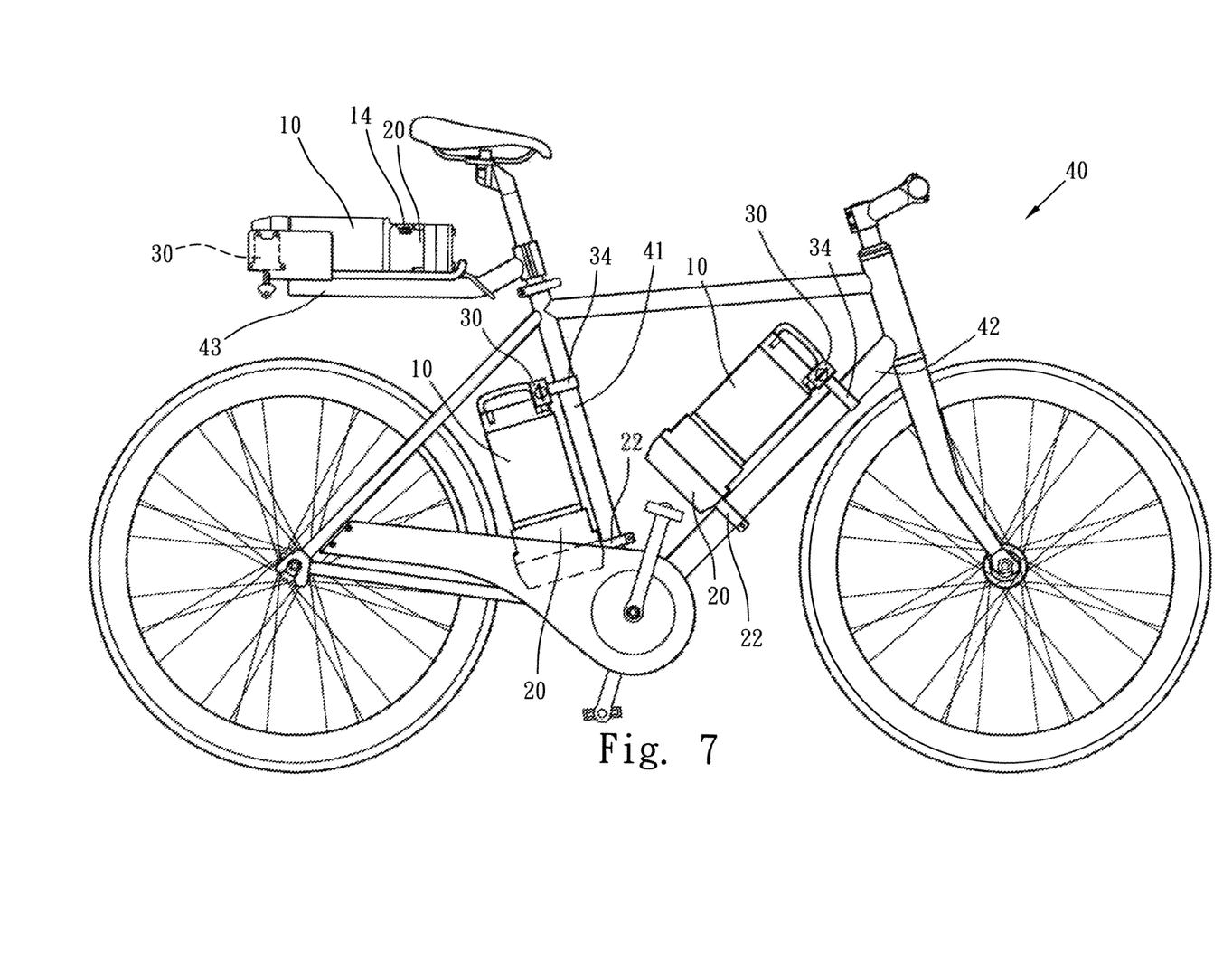
FIG. 7 shows the third embodiment of the positioning device of the present invention connected to an electric bicycle.

FIG. 7 shows the third embodiment, wherein the first and second fixing bases 20, 30 are fixed to the seat tube 41, down tube 42, carry rack 43 or any other parts such as the top tube and head tube, of the electric bicycle 40. The battery box 10 can be positioned on the different portions of the electric bicycle 40.

The battery box 10 is easily installed between the first and second fixing bases 20, 30 which are conveniently connected to desired portions of the electric bicycle 40. The installation and removal of the battery box 10 do not need any tools and the any user can handle it. The positioning device of the present invention improves the shortcomings of the conventional positioning devices.

While we have shown and described the embodiment in accordance with the present invention, it should be clear to those skilled in the art that further embodiments may be made without departing from the scope of the present invention.

What is claimed is:

1. A positioning device comprising:
a battery box having a first connection base and a second connection base on two ends thereof, the first connection base having a first positioning portion which includes a positioning member, the second connection base having a second positioning portion;

a first fixing base adapted to be electrically connected to an electric bicycle and having a reception space in which the first connection base is received, a third positioning portion located corresponding to the first positioning portion and including a positioning recess, the first and third positioning portions are engaged with each other, the first connection base being pivotable relative to the first fixing base, and a second fixing base adapted to be connected to the electric bicycle and located at one end of the second connection base, the second fixing base located in opposite to the first fixing base, the second fixing base having a fourth positioning portion and located corresponding to the second positioning portion, the second and fourth positioning portions being connected to each other.

2. The device as claimed in claim 1, wherein the positioning member is an elongate member and the positioning recess includes a first surface and a second surface, the first surface is an inclined surface and the second surface is a vertical surface which is shaped to match with a shape of the positioning member which is slid along the first and second surfaces.

3. The device as claimed in claim 1, wherein the reception space includes contact terminals located therein which are adapted to be electrically connected to the battery box.

4. The device as claimed in claim 1, wherein the second positioning portion includes a recessed area which has a first inclined surface which has a protrusion, said fourth positioning portion includes a positioning hole, the second and fourth positioning portions are connected to each other by engagement between the protrusion and the positioning hole.

5. The device as claimed in claim 4, wherein the protrusion is controlled to extend or retract by a control member.

6. The device as claimed in claim 4, wherein the second fixing base has a second inclined surface which is located corresponding to the first inclined surface.

7. The device as claimed in claim 1, wherein at least one pad is located between the reception space and the first connection base.

8. The device as claimed in claim 1, wherein the second positioning portion includes a recessed area which has a first inclined surface which has a positioning hole, said fourth positioning portion includes a protrusion, the second and fourth positioning portions are connected to each other by engagement between the protrusion and the positioning hole.

9. The device as claimed in claim 8, wherein the protrusion is controlled to extend or retract by a control member.

10. The device as claimed in claim 8, wherein the second fixing base has a second inclined surface which is located corresponding to the first inclined surface.

11. A positioning device comprising:

a battery box having a first connection base and a second connection base on two ends thereof, the first connection base having a first positioning portion which includes a positioning recess, the second connection base having a second positioning portion;

a first fixing base adapted to be electrically connected to an electric bicycle and having a reception space in which the first connection base is received, a third positioning portion located corresponding to the first positioning portion and including a positioning member, the first and third positioning portions are engaged with each other, the first connection base being pivotable relative to the first fixing base, and a second fixing base adapted to be connected to the electric bicycle and located at one end of the second connection base, the second fixing base located in opposite to the first fixing base, the second fixing base having a fourth positioning portion and located corresponding to the second positioning portion, the second and fourth positioning portions being connected to each other.

12. The device as claimed in claim 11, wherein the positioning member is an elongate member and the positioning recess includes a first surface and a second surface, the first surface is an inclined surface and the second surface is a vertical surface which is shaped to match with a shape of the positioning member which is slid along the first and second surfaces.

13. The device as claimed in claim 11, wherein the reception space includes contact terminals located therein which are adapted to be electrically connected to the battery box.

14. The device as claimed in claim 11, wherein the second positioning portion includes a recessed area which has a first inclined surface which has a protrusion, said fourth positioning portion includes a positioning hole, the second and fourth positioning portions are connected to each other by engagement between the protrusion and the positioning hole.

15. The device as claimed in claim 14, wherein the protrusion is controlled to extend or retract by a control member.

16. The device as claimed in claim 14, wherein the second fixing base has a second inclined surface which is located corresponding to the first inclined surface.

17. The device as claimed in claim 11, wherein at least one pad is located between the reception space and the first connection base.

18. The device as claimed in claim 11, wherein the second positioning portion includes a recessed area which has a first inclined surface which has a positioning hole, said fourth positioning portion includes a protrusion, the second and fourth positioning portions are connected to each other by engagement between the protrusion and the positioning hole.

19. The device as claimed in claim 18, wherein the protrusion is controlled to extend or retract by a control member.

20. The device as claimed in claim 18, wherein the second fixing base has a second inclined surface which is located corresponding to the first inclined surface.

* * * * *